(12) United States Patent
Hong

(10) Patent No.: US 6,450,566 B1
(45) Date of Patent: Sep. 17, 2002

(54) CARGO SPACE EXPANDING DEVICE OF VEHICLE

(75) Inventor: Sung-Chan Hong, Ulsan (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/927,297

(22) Filed: Aug. 10, 2001

(30) Foreign Application Priority Data

Nov. 22, 2000 (KR) .............................................. 00-69512

(51) Int. Cl.[7] .............................................. B62D 33/06
(52) U.S. Cl. ............... 296/190.11; 296/183; 296/26.11; 296/146.16
(58) Field of Search .......................... 296/26.11, 26.08, 296/29.09, 26.1, 37.6, 39.2, 190.11, 183, 185, 146.16

(56) References Cited

U.S. PATENT DOCUMENTS

| 3,169,792 | A | * | 2/1965 | Viquez |
| 3,240,527 | A | * | 3/1966 | Weiss et al. |
| 4,119,341 | A | * | 10/1978 | Cook .................... 296/146.16 |
| 4,480,868 | A | * | 11/1984 | Koto |
| 4,793,099 | A | * | 12/1988 | Friese et al. ........ 296/146.16 X |
| 5,934,727 | A | * | 8/1999 | Storc et al. ............... 296/26.11 |
| 6,186,575 | B1 | * | 2/2001 | Fisher et al. ........... 296/100.03 |
| 6,260,916 | B1 | * | 7/2001 | Hunt ..................... 296/190.11 |

\* cited by examiner

*Primary Examiner*—Joseph D. Pape
(74) *Attorney, Agent, or Firm*—Christie, Parker & Hale, LLP

(57) ABSTRACT

A cargo space expanding device for a vehicle for expanding a space available for loading baggage is provided. The device is installed between a top part of a glass and roof panel of the vehicle to fix the glass. A mid-gate is pivotally coupled to the vehicle and has an empty space which is fitted with a shock absorbing member. The empty space accommodates the glass.

7 Claims, 6 Drawing Sheets

CARGO SPACE EXPANDING DEVICE OF VEHICLE

CROSS-REFERENCE TO RELATED APPLICATION

This application claims priority of Korea patent Application No. 2000-69512, filed Nov. 22, 2000.

BACKGROUND OF THE INVENTION

1. Field of the Invention

The present invention relates to a cargo space expanding device for a vehicle and more particularly to a cargo space expanding device for a vehicle to expand a space available for loading bulky cargoes by removing a glass that limits the cargo space.

2. Brief Description of the Prior Art

In general, an empty space is offered to load baggage or cargoes at a rear part of a vehicle. The vehicle mainly aiming at carrying baggage, as shown in FIG. 1, is made to load bulky baggage in the empty cargo space and, if needed, by expanding the cargo space even to an inner space of the vehicle formed by a rear glass 10 and an internally foldable mid-gate or rear-panel 20.

In such a vehicle, parts are generally provided for blocking or expanding the inner space and the cargo space as shown in FIG. 2, such as glass 12 fixed onto a roof panel, a mid-gate 20 installed between the bottom part of the glass 12 and a body panel T, locking means 30 attached at the top part of the mid-gate 20 for fixing with the glass 12, and pivoting means 40 hinged at the bottom part of the mid-gate 20 for being fixed and supported by the body panel T and for being foldable into the inner space of a vehicle.

At this time, the locking means 30 attached at the top part of the mid-gate 20 includes a fixing bracket 31 fixed at the mid-gate 20 and a moving member 32 is coupled with the fixing bracket 31 for being hinged by a hinge pin and locked with a hitching member 33 assembled under the glass 12.

Also, the rotating means 40 positioned at the lower part of the mid-gate is constructed with a fixing bracket 41 installed at the body panel T, a connecting bracket 42 attached to the mid-gate 20 and a hinge pin 43 inserted through brackets 41, 42 to hinge and fold the mid-gate 20 into the inner space.

On the other hand, a sealing member S like a weather strip should be provided for shock absorption and air tightness between the mid-gate 20 and the hitching member 33 of the glass 12 and between the mid-gate 20 and the body panel T.

Therefore, if the moving member 32 of the locking means 30 is turned and released out of the hitching member 33 of the glass 12, the mid-gate 20 can be folded into the inner space via the hinge pin 43 of the rotating means 40. As a result, it becomes possible to load bulky baggage into the inner space of a back seat as well as a trunk of the vehicle.

However, even if the mid-gate 20 can be folded into the inner space of a vehicle, there is actually a limitation in the expandable space over the mid-gate due to the glass 12. Therefore, there is a disadvantage in the conventional structure of the cargo space expanding device because the glass blocks a baggage M bulky enough as for example shown in FIG. 6, from being easily loaded inside.

SUMMARY OF THE INVENTION

It is an object of the present invention to solve the aforementioned problem and provide a cargo space expanding device of a vehicle to expand cargo space without being blocked by a mid-gate or a glass.

In order to accomplish the aforementioned object of the present invention, there is provided a cargo space expanding device of a vehicle, the device comprising:

holding means installed between the top part of a glass and the roof panel to fix the glass;

a mid-gate forming an empty space therein for getting the glass to insert inside; and pivoting means fixed and supported at the bottom part of the mid-gate by a body panel and hinged by a hinge pin to fold the mid-gate into an inner space of a vehicle.

BRIEF DESCRIPTION OF THE DRAWINGS

Objects and aspects of the invention will become apparent from the following description of preferred embodiments with reference to the accompanying drawings in which.

DETAILED DESCRIPTION OF THE INVENTION

A preferred embodiment of the present invention will be described in detail with reference to accompanying drawings.

Figure 1:
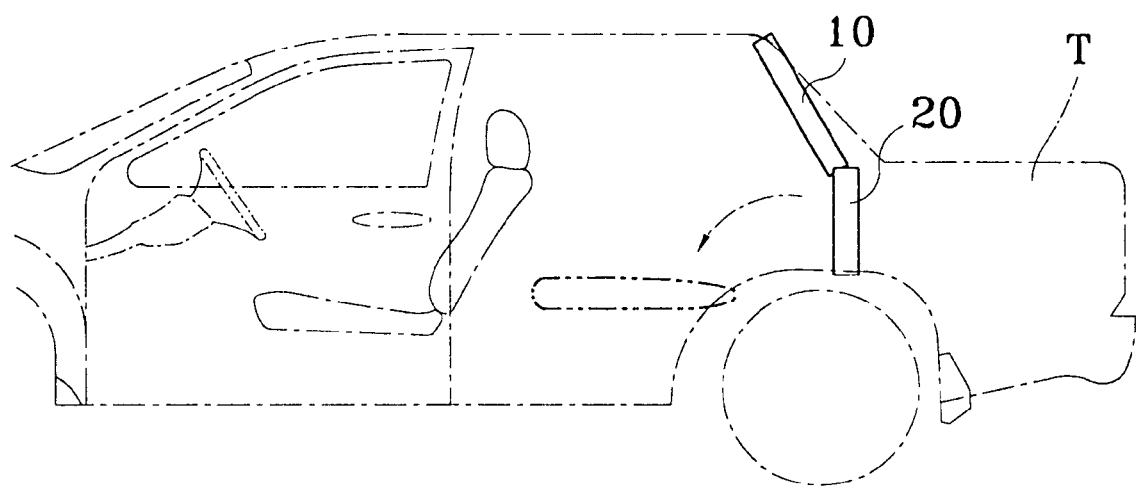
FIG. 1 is a schematic structural view for illustrating a cargo space expanding device of a vehicle in accordance with the prior art.
Figure 2:
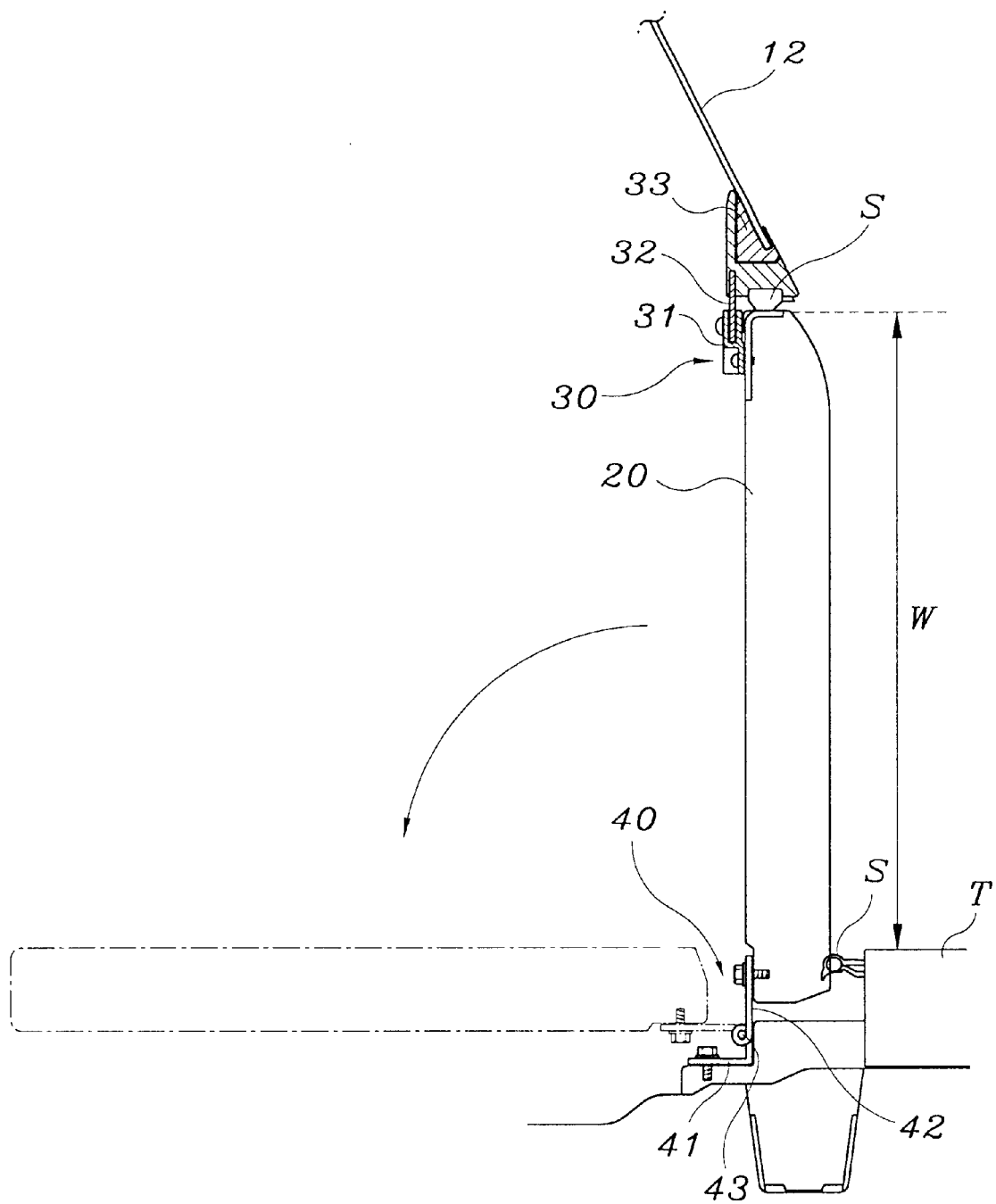
FIG. 2 illustrates an operational state of the conventional cargo space expanding device of a vehicle shown in FIG. 1.
Figure 3:
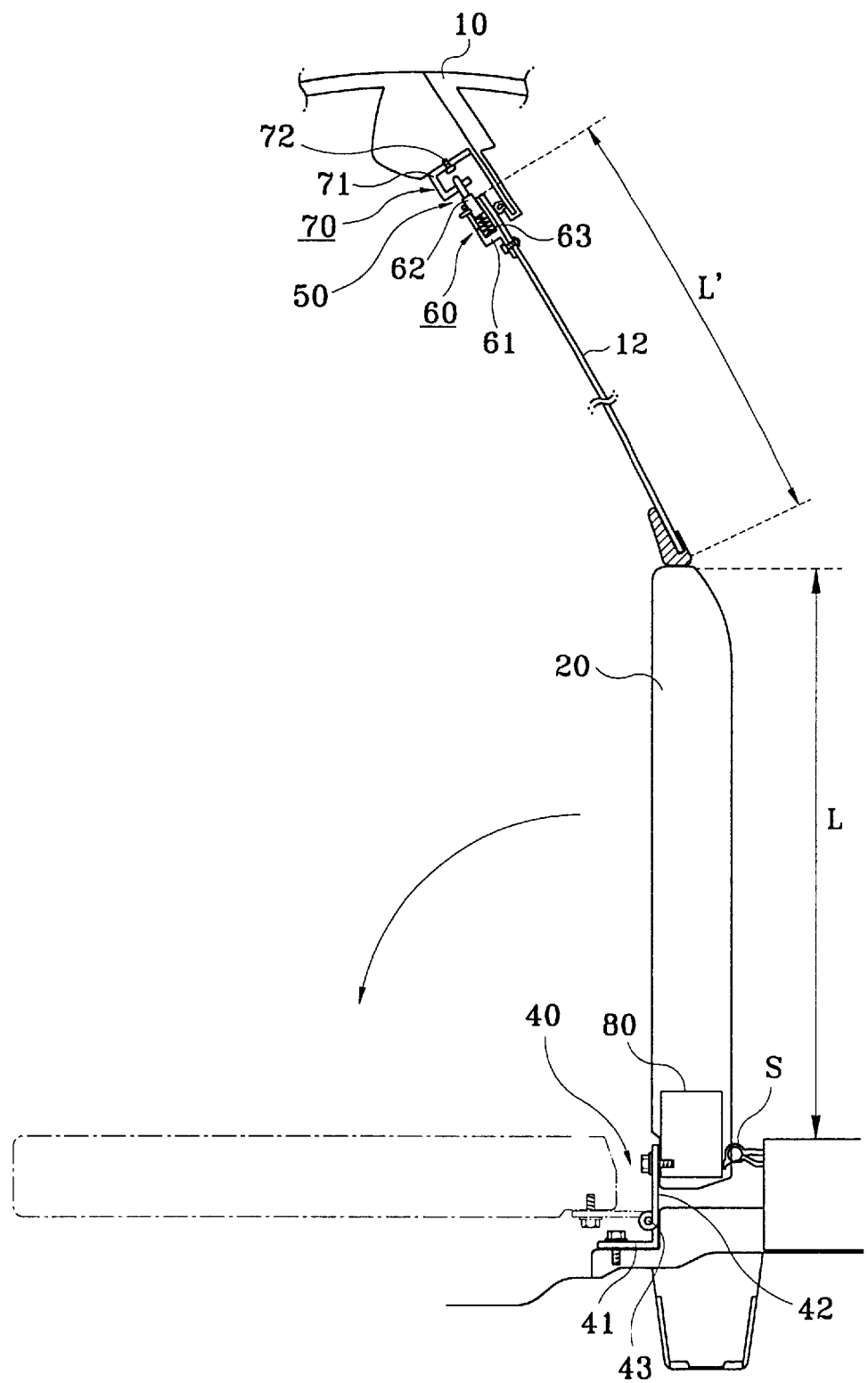
FIG. 3 is a structural view for illustrating a cargo space expanding device of a vehicle in accordance with the present invention.

FIG. 3 is a structural view for illustrating a cargo space expanding device of a vehicle in accordance with the present invention. The device comprises a glass 12 fixed onto a roof panel 10; holding means 50 installed between the top part of the glass 12 and the roof panel 10 to fix the glass 12; a mid-gate 20 including an empty space filled with a shock absorbing member 80 such as sponge or expanded uretane foam for inserting the glass 12 therein; and pivoting means 40 fixed and supported at the bottom part of the mid-gate 20 by a body panel T and hinged to fold the mid-gate 20 into an inner space of a vehicle.

At this time, the holding means 50 is constructed with a latch assembly 60 having a hook 62 accommodated in an opening 61a on a fixing bracket 61 fixed at the glass 12 by a fixing member and a striker 70 having a hitching bracket 71 coupled with a fixing member 72 to the roof panel 10 for locking or unlocking with the latch assembly 60.

Figure 4:
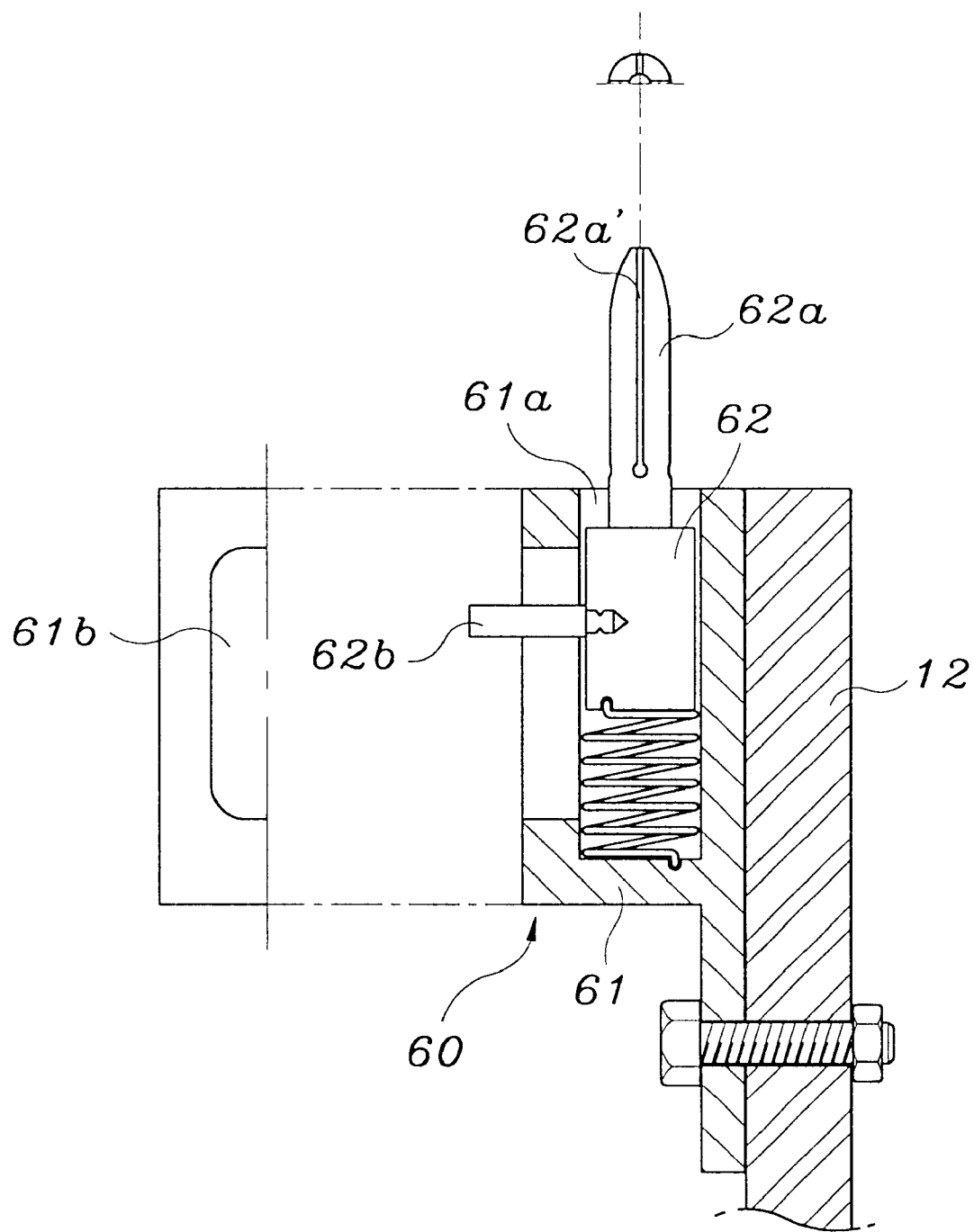
FIG. 4 is a structural view for illustrating glass fixing means in accordance with FIG. 3.

Besides, the hook 62, as shown in FIG. 4, is constructed with a hitching chuck 62a having a plurality of slots 62a fixed in the opening 61a of the fixing bracket 61 via a spring and a knob 62b vertically movable by a hand through a moving slot 61b at the lateral side of the fixing bracket 61.

Furthermore, the pivoting means 40 at the bottom part of the mid-gate 20 is constructed with a fixing bracket 41 fixed at the body panel T, as described above in the prior art, a connecting bracket 42 fixed at the internal side of the mid-gate 20 and a hinge pin 43 coupled between the brackets 41, 42 to hinge the mid-gate 20 into the inner space of the vehicle.

Operations of the present invention will be described in detail.

First of all, the knob 62b of the hook 62 is pulled down to release the hitching chuck 62a of the hook 62 out of the hitching bracket 71 of the striker 70.

If the spring supporting the hook 62 is compressed by the pulling down force of the knob 62b, the hitching chuck 62a is released out of the hitching bracket 71 to insert the glass 12 into the mid-gate 20.

At this time, if the hitching chuck 62a of the hook 62 is inserted into the hitching bracket 71 of the striker 70. By having a plurality of slots 62a; the chuck can hold an object from its circumference for fixation. The chuck can pass through the an insertion hole (not shown) of the hitching bracket 71 to slightly stretch out and generate force to fix the glass 12. On the contrary, even when the hitching chuck 62a of the hook 62 is released out of the insertion hole of the hitching bracket 71, the diameter of the hitching chuck 62a gets smaller by the downwardly moving force of the hook 62 applied by the knob 62b.

Figure 5:
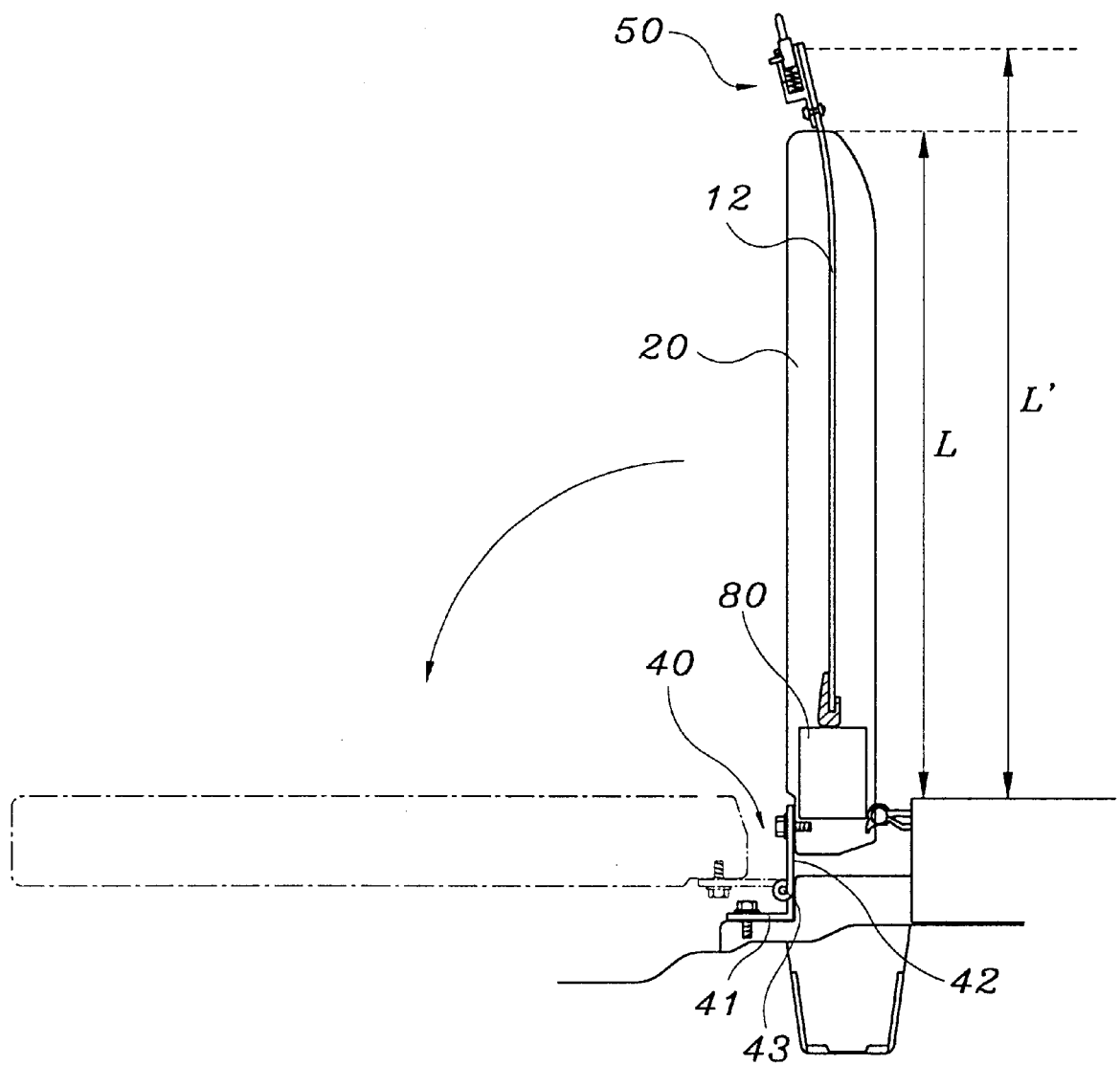
FIG. 5 illustrates an operational state of a cargo space expanding device of the present invention.

Then, when the holding means 50 is unlocked, the glass 12 moves downward to be accommodated into the mid-gate 20. At this time, the downwardly moving shock is absorbed by the shock absorbing member 80 filled into the empty space inside the mid-gate 20, as shown in FIG. 5, so that the latch assembly 60 of the holding means 50 keeps being exposed out of the mid-gate 20.

Figure 6:
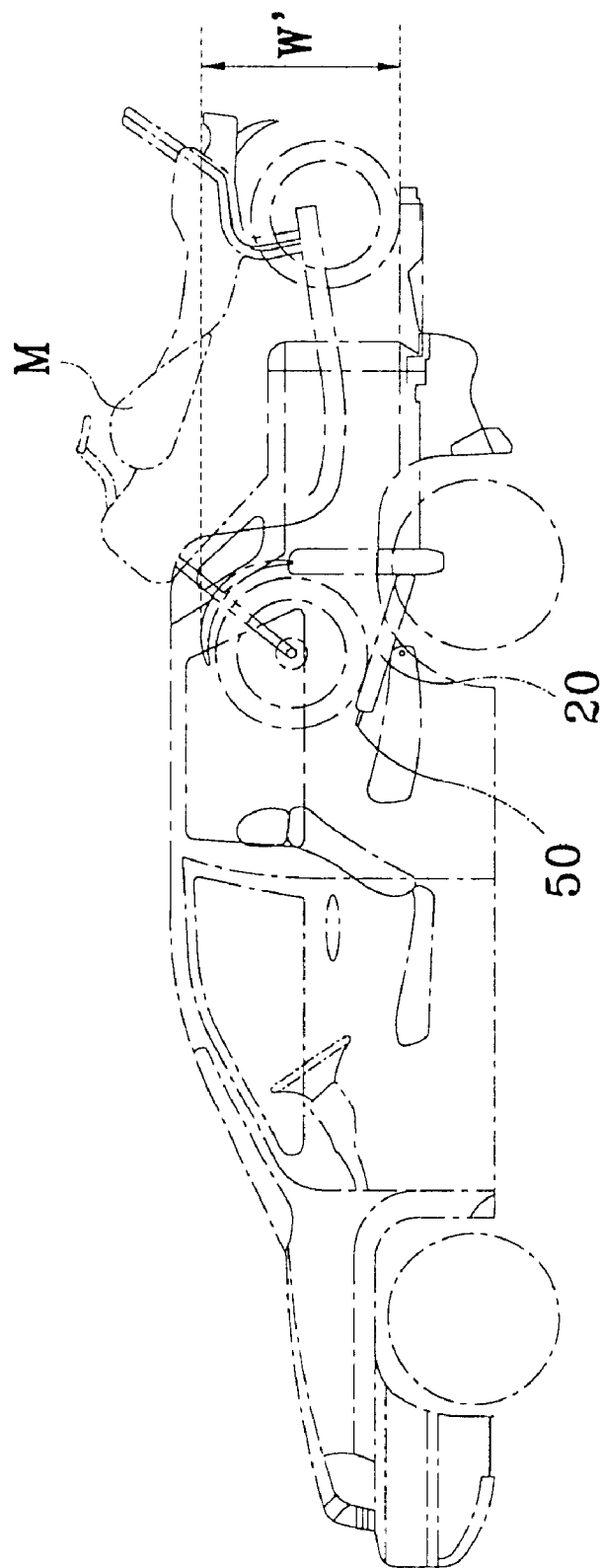
FIG. 6 illustrates a state in which a baggage is loaded into a cargo space expanding device in accordance with the present invention.

At last, when the mid-gate 20 accommodating the glass 12 is folded into the inner space, the mid-gate 20 is lowered and folded into the inner space via the hinge pin 43, making it possible to load a bulky baggage M like a motorcycle shown in FIG. 6 in the bigger inner space made in the trunk and in back seat.

As described above, the glass blocking the upper part of the cargo space is accommodated into the mid-gate and folded into the inner space of the vehicle, so that structure blocking the inner space and the basic cargo space is completely eliminated to make a bigger inner space available for loading bulky baggage.

What is claimed is:

1. A cargo space expanding device for a vehicle, the device comprising:

holding means installed between a top part of a vehicle glass and a vehicle roof panel to fix the glass;

a mid-gate having an empty space for receiving the glass therein; and pivoting means for coupling to a body panel coupled to the bottom part of the mid-gate allowing the mid-gate to fold.

2. The device, as defined in claim 1, wherein a shock absorbing member is included at the empty space of the mid-gate.

3. The device, as defined in claim 1, wherein the holding means comprises a fixing bracket for coupling with the glass, a latch assembly having a hook accommodated in an opening formed on the fixing bracket and a striker for coupling with the roof panel and for locking or unlocking with the latch assembly.

4. The device, as defined in claim 3, wherein the hook is constructed with a hitching chuck a plurality of slots and a knob vertically movable through a moving slot at a lateral side of the fixing bracket.

5. The device, as defined in claim 4, wherein the hook is fixed in the opening of the fixing bracket via a spring.

6. The device as defined in claim 2 wherein the shock absorbing member is a sponge.

7. The device as defined in claim 2 wherein the shock absorbing member is explained urethane foam.

\* \* \* \* \*

UNITED STATES PATENT AND TRADEMARK OFFICE
CERTIFICATE OF CORRECTION

PATENT NO.    : 6,450,566 B1
DATED         : September 17, 2002
INVENTOR(S)   : Sung-Chan Hong It is certified that error appears in the above-identified patent and that said Letters Patent is hereby corrected as shown below:

<u>Column 4,</u>
Line 26, after "chunk" insert -- having --.
Line 34, replace "explained" with -- expanded --.

Signed and Sealed this

First Day of June, 2004

JON W. DUDAS
*Acting Director of the United States Patent and Trademark Office*